Patented June 28, 1932

1,864,643

UNITED STATES PATENT OFFICE

HENRY DREYFUS, OF LONDON, AND WALTER BADER, OF SPONDON, NEAR DERBY, ENGLAND, ASSIGNORS TO CELANESE CORPORATION OF AMERICA, A CORPORATION OF DELAWARE

MANUFACTURE OF ALIPHATIC ACIDS AND ESTERS

No Drawing. Application filed September 27, 1926, Serial No. 138,116, and in Great Britain Ja. 20, 1926.

This invention relates to the manufacture of acetic acid and other aliphatic compounds.

The specification accompanying U. S. patent application S. No. 112,166 of Henry Dreyfus describes catalytic processes for the synthetic production of acetic acid from mixtures of carbon monoxide and hydrogen.

The specification accompanying U. S. patent application S. No. 112,165 of Henry Dreyfus describes processes for producing acetic acid and acetone by subjecting mixtures of carbon monoxide and methyl alcohol to the action of heat in the presence of catalysts capable of forming acetates which split off acetic acid or acetone or both acetic acid and acetone at elevated temperatures not exceeding about 400 to 450° C.

We have now discovered that acetic acid can be produced by the action of carbon monoxide on methyl alcohol in the presence of inorganic acid catalysts. The reaction can be expressed by the equation:—

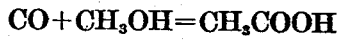
$$CO + CH_3OH = CH_3COOH$$

According to the prevailing conditions, the acetic acid formed may be obtained either in the free state, or in the form of the ester formed by condensation with the methyl alcohol present in the reaction chamber.

The methyl alcohol can be replaced wholly or in part by a methyl ether, or other compound containing one or more methoxy groups. Or the methyl alcohol can be either wholly or partly generated from or replaced by substances or mixtures of substances capable of generating methyl alcohol, and capable in the presence of carbon monoxide of being converted into acetic acid or methyl acetate under the conditions of the reaction, as hereinafter more fully described.

The operation can be performed at atmospheric pressure, but proceeds more rapidly at increased pressures. The pressure may be as high as 100, 200 or 300 atmospheres or any higher pressure that can conveniently be attained in practice. The range of temperatures usually employed is from about 200°–250° C. to about 400°–450° C., temperatures of 300° to 400° C. being preferably adopted.

Preferably a catalyst that is non-volatile or only very slightly volatile under the conditions of the reaction is used. It is desirable that the catalyst should not be reduced or otherwise chemically changed during the reaction into a non-acid or volatile body. Particularly good results are obtained with phosphorus derivatives, such as the acids derived from phosphorous, and especially the phosphoric acids, for instance, ortho, pyro or meta phosphoric acid, or mixtures of these acids. Boric acid, arsenic, and phosphomolybdic acid are also suitable for use as catalysts. Mixtures containing two or more of the aforementioned catalysts may also be employed.

When acids are used as catalysts, they may be partially neutralized to form acid salts if desired, though only to such an extent that the resulting body, at the temperature of the reaction, still contains free hydroxyl groups according to the usual formulation. A partial neutralization of the acid is particularly advantageous in cases where it is desired to reduce the volatility of the acid or to convert it into the solid form. For instance, we may use a compound which may be regarded as consisting of one molecule of a monovalent base, or its equivalent of a polyvalent base, in combination with more than one molecule of ortho phosphoric acid, so that the resulting complex phosphorus derivative is still acid at temperatures between 300° and 400° C., or other temperature used in the reaction. Thus, for instance, in accordance with the present invention, an acid aluminium phosphate of the composition $Al_2O_3.12H_3PO_4$ may be employed as catalyst.

The catalyst used may be in the liquid state, as in the case of phosphoric acid, or in the solid state, as in the case of boric acid or acid aluminium phosphate, at the temperature of the reaction, and may be distributed over or supported on an inert solid carrier, for example, coke, graphite, etc. The catalysts may be charged into the reaction chamber before the beginning of the operation, or may be added during the operation, for example, as a spray of a liquid catalyst, or in some cases in the form of vapour of a volatile ester for instance a methyl ester, which is decomposed under the conditions of the reaction to yield an acid catalyst, or may be introduced into or generated in the reaction chamber in any other way.

The carbon monoxide can be introduced either as such or in the form of industrial or other mixtures with hydrogen and/or inert gases, for example, nitrogen, methane, etc. Thus, we may use water gas, producer gas or coke oven gas, but it is preferable to use carbon monoxide alone.

The methyl alcohol may be replaced by dimethyl ether, the product of the reaction appearing as methyl acetate or, if water is present, as free acetic acid.

Instead of introducing methyl alcohol itself, into the reaction chamber, substances or mixtures of substances which are capable of decomposing or combining or otherwise reacting to form methyl alcohol can be employed; thus, a methyl ester, together with water if necessary, may be admitted to the reaction chamber in place of or in addition to the methyl alcohol.

Among the substances which can thus be used may be mentioned by way of example, methyl formate, and methyl acetate.

It is interesting to note that, in the case of methyl formate, the reaction appears to involve the formation of carbon monoxide and methyl alcohol by decomposition of the methyl formate, the carbon monoxide afterwards combining with the methyl alcohol in the presence of the acid catalysts. In any case, the net result of the passage of the methyl formate over the acid catalyst is the conversion of the methyl formate into its isomer acetic acid.

It will be seen that it is possible in accordance with this invention to use substances—for example, methyl formate—which in themselves provide both of the essential elements for the reaction, since they are capable of yielding both methyl alcohol and carbon monoxide.

Thus it is possible to obtain acetic acid without the use of pressure by conducting vapours of methyl alcohol over the catalyst at about 350° to 450° C., the carbon monoxide being supplied by the breakdown of a part of the methyl alcohol to carbon monoxide and hydrogen.

Of course the choice of the raw materials used, and of the conditions employed, will depend on the prevailing circumstances. Usually it is preferable when using methyl alcohol to conduct the operation under pressure and to select the other conditions of the reaction so as to minimize the breakdown of methyl alcohol.

Instead of starting with methyl alcohol as such or in the form of dimethyl ether or methyl esters, we may employ mixtures of substances which are capable of being combined to form methyl alcohol, and particularly mixtures of carbon monoxide and hydrogen. For example, water gas may be converted into methyl alcohol by the action of heat and pressure in the presence of zinc oxide or other suitable catalyst. The resulting products are led without cooling direct to a chamber containing an acid catalyst for conversion into acetic acid. Preferably the carbon monoxide necessary for the conversion of the methyl alcohol into acetic acid is present in the initial mixture of carbon monoxide and hydrogen, the quantity of carbon monoxide in such case being in excess of that necessary for the formation of methyl alcohol. The necessary proportion of carbon monoxide may however be incorporated in the gaseous mixture immediately before it is passed over the acid catalyst. The reaction takes place in two stages, represented by the following equations:

$$CO + 2H_2 = CH_3OH$$
$$CH_3OH + CO = CH_3COOH$$

We have also found that the preliminary treatment for the production of methyl alcohol as a separate product can be eliminated. Acetic acid can thus be obtained by passing a mixture of carbon monoxide and hydrogen in the requisite proportions over an acid catalyst. In this case, the reaction can be regarded as taking place in two stages involving the production of methyl alcohol and the simultaneous transformation of the methyl alcohol into acetic acid, or may be represented more simply as occurring in a single stage according to the following equation:

$$2CO + 2H_2 = CH_3COOH$$

However it is preferable to use previously prepared methyl alcohol or dimethyl ether or a methyl ester in conjunction with carbon monoxide.

Conveniently, the process is carried out in a continuous manner by mixing carbon monoxide, or water gas, or other gas containing carbon monoxide, with the vapour of methyl alcohol or dimethyl ether or methyl formate or acetate, and passing the mixture into a reaction chamber containing the acid catalyst in liquid or solid form, the reaction chamber being heated to a temperature of about 250° to 450° C., and preferably between 300° and 400° C., but the invention is not limited in this respect.

According to one form of the invention, a mixture of carbon monoxide and the vapour of methyl alcohol is prepared by bubbling carbon monoxide or a gas containing the same through a heated vessel containing methyl alcohol and is brought into contact with the acid catalyst. However, the methyl alcohol, dimethyl ether etc. may be introduced in the form of vapour or spray and mixed with the carbon monoxide or gas containing the same, or any other suitable procedure may be adopted.

The presence of water in the gaseous mixture favours the formation of free acetic acid, particularly when dimethyl ether or methyl esters or similar bodies are employed in place of or together with methyl alcohol.

When methyl alcohol or its derivatives are used as starting material, the reaction can take place at ordinary pressure but is preferably effected under pressure which may, for instance, be as high as 50 to 200 atmospheres, or higher pressures may be used. For example, with 100 atmospheres, very good results are obtained.

If, however, mixtures of carbon monoxide and hydrogen are used as sole starting material, without admixture with methyl alcohol, dimethyl ether, etc., the pressures are preferably on the higher side, for instance from about 150 to 300 atmospheres or more.

Especially favorable results are obtained by the use of a large excess of carbon monoxide and/or hydrogen at increased pressures, since under these conditions, the formation of undesirable decomposition products is minimized or prevented.

As previously stated, the acetic acid formed may be obtained either in the free state or in the form of the methyl ester which is formed by condensation of the acetic acid with the methyl alcohol present in the reaction chamber. The reaction can be so directed so as to give methyl acetate practically exclusively. The production of methyl acetate is favoured by the presence of excess of methyl alcohol in the reaction chamber and the absence of water or the use of only small amounts of water. If however no excess of methyl alcohol is used, and water is present in sufficient quantities, acetic acid is obtained, while mixtures of acetic acid and methyl acetate in various proportions can be obtained in accordance with the conditions adopted.

When methyl formate is used a so-called isomerization to acetic acid takes place.

If the acetic acid obtained by this process is intended for the manufacture of acetone, the gases issuing from the reaction chamber may without cooling be brought into contact with acetone-forming catalysts. For example, the reaction products may be led directly over manganous oxide at temperatures of 400°–500° C.

If the operation is so conducted as to produce substantial quantities of methyl acetate, the methyl acetate so obtained may be easily saponified and worked up into acetic acid and methyl alcohol or dimethyl ether, the two latter being returned for recirculation through the plant for conversion into acetic acid.

The process can be carried into effect in many different ways, and we do not restrict our invention to the following examples of forms of apparatus and methods of procedure, said examples being given by way of explanation and being in no way limitative in character.

According to one method of performing the invention, we use a closed train of apparatus comprising a gas circulating pump, which drives the carbon monoxide or gas mixture containing carbon monoxide first through a mixing chamber, where dimethyl ether, methyl alcohol, etc., and/or water may be incorporated with the gas in the form of vapour or where the composition of the gas may be adjusted (e. g. by adding hydrogen). The resulting gaseous mixture then passes through a heat exchanger into the reaction chamber. The products issuing from the reaction chamber pass through the heat exchanger to a condenser provided with a receiver, in which the uncondensable gases are separated from the liquid products. The liquid products are withdrawn and the gases are returned to the gas circulating pump. This circuit may be supplemented by pressure gauges, traps for acid, preheaters, flow meters, temperature controls, and so on.

The reaction chamber may contain any device which will bring the gas well into contact with the catalyst. For instance in case of a liquid the gases may be bubbled through the liquid or the reaction chamber may be arranged as a washing column, or it may be fitted with agitators, or it may be rotary, and if desired provided with carrier material for the liquid. If the catalyst be a solid, or a liquid spread on a solid carrier, it is advantageously used in granular form. It is preferable to employ a large mass of a liquid catalyst.

Both the catalyst and the gases should be reasonably free of such impurities as would neutralize the acid.

The different parts of the apparatus are preferably protected against corrosion by acids and carbon monoxide. Thus, for example, it is preferable to avoid the exposure of the gases to the action of iron in the system, although special alloys that will not form iron carbonyl can be used with advantage. The vessels containing or in contact with acids are preferably suitably protected, according to the kind of acid present. For instance, the parts in contact with acetic acid may be made of, or lined with, copper, while those containing phosphoric acid may have a lining of graphite or gold, or may be made of, or lined with copper. In using copper in contact with phosphoric acid it is preferable to prevent the access of oxygen to the apparatus.

The process of the saponification of fatty acid esters so as to obtain concentrated fatty acids forms the subject matter of application No. 295,611; while the manufacture of acetic acid by subjecting a mixture of carbon monoxide and hydrogen to the action of an inorganic acid catalyst forms the subject matter of a divisional application No. 347,448 filed March 15, 1929.

The following examples illustrate some technical applications of our process, but as will be understood the invention is not limited in any way thereto.

Example 1

Carbon monoxide at about 100–180 atmospheres pressure is bubbled through methyl alcohol containing about 5–20% of water and heated to about 60–80° C., and the resulting mixture of gases and vapours is passed through a reaction chamber heated to about 300°–400° C. The reaction chamber may be filled with coke or graphite soaked in phosphoric acid or with acid aluminium phosphate, or may take the form of a slowly rotating chamber which is about one-third full of phosphoric acid and is filled with graphite pebbles or other materials presenting an extended surface. The acetic acid produced is condensed preferably at low temperatures and if necessary, redistilled, the uncondensed gases being returned for recirculation and further treatment in the system.

In this example if a sufficiently large excess of carbon monoxide is used, the reaction can proceed in the presence of very small quantities of water or in the absence of water. The methyl alcohol can also be separately vaporized in any way, and the resulting vapours mixed with the carbon monoxide.

Example 2

Anhydrous methyl alcohol is substituted for methyl alcohol containing water in the foregoing example and the methyl alcohol is heated to about 100–120° C. while the carbon monoxide is bubbled through. The gas mixture is then brought into contact with the catalyst and afterwards treated in the manner described in Example 1. In this case the acetic acid is obtained practically completely in the form of methyl acetate.

Example 3

A mixture of about 55–65% by volume of carbon monoxide with about 35–45% by volume of hydrogen is passed under a pressure of about 150–200 atmospheres through a vessel containing zinc oxide and kept at a temperature of about 300–400° C. The resulting mixture containing carbon monoxide and methyl alcohol vapour is passed without cooling over an acid catalyst maintained at about 300–400° C. The reaction products are separated and the uncondensable gases are returned for re-circulation through the system.

Example 4

Purified water gas is compressed to 250–300 atmospheres and after bubbling through water at a temperature of about 100–150° C. is passed through a chamber maintained at a temperature of about 280° C.–400° C. and filled with coke or other inert porous material that has been impregnated with phosphoric acid, or through a rotary reaction chamber containing phosphoric acid, such as that described in Example 1. The products are condensed and the uncondensed gases are recirculated by means of a gas-circulating pump, and the condensate is collected and redistilled to obtain the acetic acid. The nitrogen and other inert gases that accumulate in the system are removed either intermittently or continuously and replaced by fresh supplies of water gas.

In either of the Examples 1 and 2, the methyl alcohol may be replaced by dimethyl ether, methyl formate or methyl acetate, or mixtures of these bodies with each other or with methyl alcohol, provided that these substances or their vapours are mixed in the appropriate proportions with the carbon monoxide.

As previously stated, the process may be directed to the manufacture of methyl acetate as practically sole product of the reaction. In this case, if acetic acid is desired as ultimate product, the methyl acetate is saponified and the methyl alcohol or dimethyl ether simultaneously produced is re-circulated through the system for ultimate conversion into acetic acid.

This method of operation is of particular interest since we have found it possible to control the saponification of esters of organic acids in such manner as to produce the free acids in an anhydrous condition. For this purpose the saponification is effected by means of just the theoretical amount of water required for the reaction, a strong mineral acid, for example, phosphoric acid or sulphuric acid, being preferably used as saponifying agent.

The reaction proceeds according to the following equation:

$$2CH_3COO.CH_3 + H_2O = 2CH_3COOH + (CH_3)_2O$$

It is preferred to use phosphoric acid as saponifying agent, since it does not act as an oxidizing agent at the temperature employed. The reaction takes place at temperatures between about 150° and about 300° C., temperatures between 180° and 220° C. being especially advantageous. For instance, at 200° C. the reaction proceeds rapidly, and results in substantially a quantitative yield.

The more highly hydrated forms of phosphoric acid, for instance ortho phosphoric acid and pyrophosphoric acid, are capable of supplying the water required for the saponification, being themselves at the same time dehydrated to the form of meta phosphoric acid. It is therefore possible to perform the reaction in a continuous manner, by continuously introducing supplies of ester and water in the requisite proportions into the phosphoric acid, the phosphoric acid serving in effect as a carrier for the water.

The saponification may be carried out in any apparatus designed for the interaction of gas and liquids, for example, wash towers, mixers, bubblers, etc.

The saponification of the methyl acetate may be carried out continuously with its production. Thus for instance a mixture of carbon monoxide and methyl alcohol vapour may be passed under pressure over phosphoric acid at 300°–400° C., and the products of reaction containing methyl acetate, preferably expanded to lower pressures, for instance, atmospheric pressure are passed together with the requisite quantity of steam through a chamber containing phosphoric acid maintained at lower temperatures, for example, 180°–250° C.

It will be seen from the foregoing description that the same catalyst, for example, phosphoric acid, can be used under different conditions to produce methyl acetate and to convert the methyl acetate into acetic acid and dimethyl ether. The acetic acid can be condensed and the dimethyl ether, which is gaseous at ordinary temperatures can be returned for admixture with further quantities of carbon monoxide for conversion into acetic acid.

The methyl acetate is however, preferably separated from the uncondensable gases with which it is mixed and is converted by a separate operation into glacial acetic acid and dimethyl ether.

The following examples will illustrate this method of saponification, but we do not restrict our invention to these particular methods.

Example 5

A closed copper vessel of high cylindrical shape with a quick running agitator of the propeller type is nearly filled with phosphoric acid and kept by outside heating at 180°–220° C. The vapour of methyl acetate is introduced near the bottom of the vessel, and also the required amount of steam, while the top is connected to a condenser and receiver. The gas escaping from the receiver is pure methyl ether. The condensate is glacial acetic acid, with more or less unchanged methyl acetate, which is easily distilled off.

Example 6

A wash tower, containing copper plates arranged in the usual manner, is heated to 180–200° C. and phosphoric acid is run through it from top to bottom. The acid is circulated back to the top by a steam jet, which also acts as a hydrating agent. Methyl acetate vapour is led up the tower in counter current to the hydrated acid. The products are the same as in Example 1.

The invention is not limited to any of the particular embodiments, whether of the main reaction or of the subsidiary reactions, herein described, but may be performed by any other methods falling within the scope of the following claims.

It is to be understood that though certain ranges of temperature and other conditions are herein mentioned as those preferred for use with certain catalysts and certain raw materials the invention is not limited in these respects. The temperatures used in any particular case are preferably those which are found by experience to give a maximum yield of acetic acid or methyl acetate with a minimum amount of undesirable by-products. Thus if a catalyst that is decomposable at high temperatures is employed, for instance an inorganic acid containing organic groups, the reaction is conducted at suitably lower temperatures and at appropriate conditions of pressure, etc. so as to prevent or minimize modification of the catalyst to an inactive form.

Observing similar precautions as to temperature, pressure, etc. it is also possible to extend the process to the treatment of higher alcohols, for instance, ethyl alcohol, etc., or their ethers or other appropriate derivatives, for the production of higher acids, for instance, propionic acid, or their corresponding esters.

What we claim and desire to secure by Letters Patent is:—

1. Process for the manufacture of compounds containing the acetyl group which comprises subjecting methyl alcohol to the action of carbon monoxide in the presence of an inorganic acidic catalyst containing at least one acidic hydroxyl group directly linked to a non-metallic element.

2. Process for the manufacture of compounds containing the acetyl group which comprises subjecting methyl alcohol to the action of carbon monoxide in the presence of a phosphoric acid.

3. Process for the manufacture of compounds containing the acetyl group which comprises subjecting methyl alcohol to the action of carbon monoxide in the presence of pyrophosphoric acid.

4. Process for the manufacture of compounds containing the acetyl group which comprises subjecting methyl alcohol to the action of carbon monoxide in the presence of an inorganic acidic catalyst containing at least one acidic hydroxyl group directly linked to a non-metallic element at temperatures between about 200° C. and about 450° C., and under pressure.

5. Process for the manufacture of compounds containing the acetyl group which comprises subjecting methyl alcohol to the action of carbon monoxide in the presence of a phosphoric acid at temperatures between about 200° C. and about 450° C., and under pressure.

6. Process for the manufacture of compounds containing the acetyl group which comprises subjecting methyl alcohol to the action of carbon monoxide in the presence of a phosphoric acid at temperatures between about 200° C. and about 450° C., and under pressure of more than 50 atmospheres.

7. Process for the manufacture of compounds containing the acetyl group which comprises subjecting methyl alcohol to the action of carbon monoxide in the presence of a phosphoric acid at temperatures between about 300° C. and about 400° C., and under pressure of more than 50 atmospheres.

8. Process for the manufacture of compounds containing an alkacyl group which comprises subjecting an aliphatic alcohol of the formula

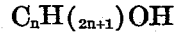

to the action of carbon monoxide in the presence of an inorganic acidic catalyst containing at least one acidic hydroxyl group directly linked to a non-metallic element.

9. Process for the manufacture of compounds containing an alkacyl group which comprises subjecting an aliphatic alcohol of the formula

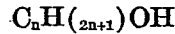

to the action of carbon monoxide in the presence of a phosphoric acid.

10. Process for the manufacture of compounds containing an alkacyl group which comprises subjecting an aliphatic alcohol of the formula

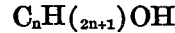

to the action of carbon monoxide in the presence of pyrophosphoric acid.

11. Process for the manufacture of compounds containing an alkacyl group which comprises subjecting an aliphatic alcohol of the formula

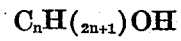

to the action of carbon monoxide in the presence of an inorganic acidic catalyst containing at least one acidic hydroxyl group directly linked to a nonmetallic element at temperatures between about 200° C. and about 450° C., and under pressure.

12. Process for the manufacture of compounds containing an alkacyl group which comprises subjecting an aliphatic alcohol of the formula

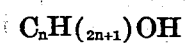

to the action of carbon monoxide in the presence of a phosphoric acid at temperatures between about 200° C. and about 450° C., and under pressure.

13. Process for the manufacture of compounds containing an alkacyl group which comprises subjecting an alkoxy compound to the action of carbon monoxide in the presence of an inorganic acidic catalyst containing at least one acidic hydroxyl group directly linked to a non-metallic element.

14. Process for the manufacture of compounds containing an alkacyl group which comprises subjecting an alkoxy compound to the action of carbon monoxide in the presence of an inorganic acidic catalyst containing a least one acidic hydroxyl group directly linked to a non-metallic element at temperatures between about 200° C. and 450° C., and under pressure.

15. Process for the manufacture of compounds containing the acetyl group which comprises subjecting a compound containing a methoxy group to the action of carbon monoxide in the presence of an inorganic acidic catalyst containing at least one acidic hydroxyl group directly linked to a non-metallic element.

16. Process for the manufacture of compounds containing the acetyl group which comprises subjecting a compound containing a methoxy group to the action of carbon monoxide in the presence of phosphoric acid at temperatures between about 200° C. and about 450° C., and under pressure.

17. Process for the manufacture of compounds containing an alkacyl group which comprises subjecting an alkyl derivative of water to the action of carbon monoxide in the presence of an inorganic acidic catalyst containing at least one acidic hydroxyl group directly linked to a non-metallic element.

18. Process for the manufacture of compounds containing an alkacyl group which comprises subjecting an alkyl derivative of water to the action of carbon monoxide in the presence of a phosphoric acid at temperatures between about 200° C. and about 450° C., and under pressure.

19. Process for the manufacture of compounds containing the acetyl group which comprises subjecting a methyl derivative of water to the action of carbon monoxide in the presence of an inorganic acidic catalyst containing at least one acidic hydroxyl group directly linked to a non-metallic element.

20. Process for the manufacture of compounds containing the acetyl group which comprises subjecting a methyl derivative of water to the action of carbon monoxide in the presence of a phosphoric acid at temperatures between about 200° C. and about 450° C., and under pressure.

21. Process for the manufacture of compounds containing the acetyl group which comprises subjecting methyl alcohol and dimethyl ether to the action of carbon monoxide in the presence of a phosphoric acid at temperatures between about 200° C. and about 450° C., and under pressure.

22. Process for the manufacture of acetic acid which comprises bringing a gaseous mixture of methyl alcohol, carbon monoxide and water into contact with an inorganic acidic catalyst containing at least one acidic hydroxyl group directly linked to a non-metallic element at temperatures between about 200° C. and about 450° C., and under pressure.

23. Process for the manufacture of acetic acid which comprises bringing a gaseous mixture of methyl alcohol, carbon monoxide and water into contact with a phosphoric acid at temperatures between about 200° C. and about 450° C., and under pressure.

24. Process for the manufacture of acetic acid which comprises bringing a gaseous mixture of a methoxy compound, carbon monoxide and water into contact with an inorganic acidic catalyst containing at least one acidic hydroxyl group directly linked to a non-metallic element at temperatures between about 200° C. and about 450° C., and under pressure.

25. Process for the manufacture of acetic acid which comprises bringing a gaseous mixture of a methoxy compound, carbon monoxide and water into contact with a phosphoric acid at temperatures between about 200° C. and about 450° C., and under pressure.

26. Process for the manufacture of a fatty acid which comprises bringing a gaseous mixture containing an aliphatic alcohol, carbon monoxide and water into contact with an inorganic acidic catalyst containing at least one acidic hydroxyl group directly linked to a non-metallic element at temperatures between about 200° C. and about 450° C., and under pressure.

27. Process for the manufacture of a fatty acid which comprises bringing a gaseous mixture containing an aliphatic alcohol, carbon monoxide and water into contact with a phosphoric acid.

28. A cyclic process for the manufacture of acetic acid which comprises subjecting a methyl derivative of water to the action of carbon monoxide in the presence of an inorganic acidic catalyst containing at least one acidic hydroxyl group directly linked to a non-metallic element, converting the methyl acetate content of the reaction product into free acetic acid by saponification in the presence of substantially the quantity of water necessary for the production of glacial acetic acid and dimethyl ether, and returning the dimethyl ether to react with carbon monoxide.

29. A cyclic process for the manufacture of acetic acid which comprises subjecting a methyl derivative of water to the action of carbon monoxide in the presence of an inorganic acidic catalyst containing at least one acidic hydroxyl group directly linked to a non-metallic element, converting the methyl acetate content of the reaction product into free acetic acid by saponification with phosphoric acid in the presence of substantially the quantity of water necessary for the production of glacial acetic acid and dimethyl ether, and returning the dimethyl ether to react with carbon monoxide.

In testimony whereof we have hereunto subscribed our names.

HENRY DREYFUS.
WALTER BADER.